US009172490B2

(12) United States Patent
Freimuth et al.

(10) Patent No.: US 9,172,490 B2
(45) Date of Patent: Oct. 27, 2015

(54) VIRTUAL WAVELENGTH NETWORKS

(75) Inventors: Douglas M. Freimuth, New York, NY (US); Vasileios Pappas, Elmsford, NY (US); Sumedh W. Sathaye, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 13/492,205

(22) Filed: Jun. 8, 2012

(65) Prior Publication Data
US 2013/0330077 A1    Dec. 12, 2013

(51) Int. Cl.
*H04J 14/00* (2006.01)
*H04J 14/02* (2006.01)

(52) U.S. Cl.
CPC .................... *H04J 14/0254* (2013.01)

(58) Field of Classification Search
CPC .............. H04J 14/0236; H04J 14/0247; H04J 14/0252; H04J 14/0254
See application file for complete search history.

(56) References Cited

U.S. PATENT DOCUMENTS

| | | | |
|---|---|---|---|
| 4,542,497 A | 9/1985 | Huang et al. | |
| 6,463,454 B1 | 10/2002 | Lumelsky et al. | |
| 6,578,068 B1 | 6/2003 | Bowman-Amuah | |
| 6,631,134 B1 | 10/2003 | Zadikian | |
| 6,681,232 B1 | 1/2004 | Sistanizadeh et al. | |
| 7,076,552 B2 | 7/2006 | Mandato | |
| 7,221,945 B2 | 5/2007 | Milford | |
| 7,254,645 B2 | 8/2007 | Nishi | |
| 7,394,985 B1 | 7/2008 | Wang | |
| 7,587,453 B2 | 9/2009 | Bhrara et al. | |
| 7,602,807 B2 | 10/2009 | Zadikian | |
| 7,984,152 B2 | 7/2011 | Anschutz | |
| 8,126,330 B2 | 2/2012 | Wisseman | |
| 8,149,439 B2 | 4/2012 | Morales et al. | |
| 2002/0109880 A1 | 8/2002 | Mukherjee | |
| 2003/0120822 A1* | 6/2003 | Langrind et al. ............... | 709/251 |
| 2004/0230578 A1 | 11/2004 | Graves et al. | |
| 2005/0177749 A1* | 8/2005 | Ovadia .......................... | 713/201 |
| 2005/0198247 A1* | 9/2005 | Perry et al. .................... | 709/223 |
| 2005/0216590 A1* | 9/2005 | Aubin et al. .................. | 709/226 |
| 2009/0147792 A1 | 6/2009 | Anschutz | |
| 2010/0135661 A1 | 6/2010 | Youn | |

(Continued)

FOREIGN PATENT DOCUMENTS

| | | |
|---|---|---|
| KR | 2005062706 A | 7/2005 |
| KR | 20050062706 A | 7/2005 |
| WO | 2007016942 A1 | 2/2007 |

OTHER PUBLICATIONS

Office Action dated Oct. 23, 2014, regarding U.S. Appl. No. 13/548,442, 25 pages.

(Continued)

*Primary Examiner* — Dzung Tran
(74) *Attorney, Agent, or Firm* — Yee & Associates, P.C.; Jennifer R. Davis (57) ABSTRACT

A computer implemented method provisions optical wavelength connections. A set of applications is grouped to form a set of application groups. A single optical connection having a bandwidth is established through a management plane for each of the set of application groups. A set of persistent upper layer connections is then established for each of the set of application groups. The underlying optical connection is adjusted while preserving the state of the upper layer protocols.

12 Claims, 5 Drawing Sheets

(56) References Cited

U.S. PATENT DOCUMENTS

| | | |
|---|---|---|
| 2010/0150558 A1 | 6/2010 | Wisseman |
| 2010/0332262 A1 | 12/2010 | Horvitz et al. |
| 2011/0081147 A1* | 4/2011 | Lee et al. .................. 398/48 |
| 2013/0347068 A1 | 12/2013 | Elleboe et al. |
| 2014/0330973 A1 | 11/2014 | Freimuth et al. |

OTHER PUBLICATIONS

Varela, et al., "Ant Colony Optimisation for Virtual-Wavelength-Path Routing and Wavelength Allocation," IEEE Congress of Evolutionary Computation, CEC, Jul. 6, 1999, pp. 1809-1816.

Wang, et al. "c-Through: Part-time Optics in Data Centers," SIGCOMM '10, Aug. 30-Sep. 10, 2010, 12 pages.

Balasubramian, et al. NetQoPE: A Model-driven Network QoS Provisioning Engine for Distributed Real-time and Embedded Systems, IEEE Real-Time and Embedded Technology and Applications Symposium, Apr. 22-24, 2008, 10 pages.

Network Aware Resource Broker (NARB) and Resource Computation Element (RCE) Architecture, Version 2.1b, retrieved on Oct. 12, 2012 from https://wiki.internet2.edu/confluence/download/attachments/19074/narb-rce-architecture-v2.1b.pdf?version=1, University of Southern California (USC) Information Sciences Institute (ISI), Apr. 2008, 11 pages.

U.S. Appl. No. 13/548,442, filed Jul. 13, 2012, 44 pages.

Notice of Allowance dated May 13, 2015, regarding U.S. Appl. No. 13/548,442, 42 pages.

* cited by examiner

VIRTUAL WAVELENGTH NETWORKS

This invention was made with Government support under Contract No. W911QX-10-C-0094 awarded by Defense Advanced Research Projects Agency (DARPA). The Government has certain rights in the invention.

BACKGROUND

1. Field

The disclosure relates generally to a computer implemented method, a computer program product, and a data processing system for provisioning optical network connections. More specifically the disclosure relates to a computer implemented method, a computer program product, and a data processing system for provisioning virtual wide area connections in an optical network.

2. Description of the Related Art

For purposes of the following descriptions, a communications network can be generally defined as a collection of network nodes and end nodes, or end stations, interconnected through communications links. A network node can be characterized as a data processing system that provides certain functions within the network, such as routing of messages between itself and its adjacent, or neighboring, nodes, selection of routes for messages to be transmitted between two nodes, and the furnishing of directory services to connected end nodes. The link between nodes may be permanent communications links, such as conventional cable connections or links, that are enabled only when needed, such as dial-up telephone connections.

End nodes are exemplified by devices, such as display terminals, intelligent workstations, printers, and the like, which do not provide routing or route selection or directory services to other nodes in the network. Collectively, the network nodes, the end nodes and the links between the nodes are referred to as network resources. The physical configuration and characteristics of the various nodes and links in a network are said to be the topology of the network.

For a user at one end node to exchange data with another user at another end node, a path, or route, must be set up through the network. The route will include the end node at which the first user is located (the source end node), the end node at which the second user is located (the destination end node), possibly one or more network nodes and the links, or transmission groups, which connect the nodes on the route. A transmission group is normally defined as a set of parallel links with similar characteristics that form a single logical link that has a higher capacity than each of the individual links in the group. For purposes of the following discussion, it should be assumed that the term transmission group can also contemplate a single physical link. The terms are used interchangeably in the following description.

In an ideal network, data provided by a first user is transmitted to a second user at no cost, with zero delays, with perfect reliability, and with complete security regardless of how many nodes and transmission groups might be included in the route between the two users. Unfortunately, real data communications networks lack these ideal characteristics. Varying amounts of delays may be introduced over different routes. Some types of transmission groups may cost more to use, or introduce more delay than others. The integrity of transmitted data may be protected better on some transmission groups than others. Other "imperfections" not even discussed above exist in a real network.

Because nodes and transmission groups in a real network possess different characteristics, it is a common practice to assign weights to both nodes and transmission groups, and to use the assigned weights in computing an optimal, or least, weight route through the network from one user to another. The weight generally reflects how closely a given node, or transmission group, meets a predetermined standard of performance. For example, if weights were to be assigned on the basis of delay characteristics alone, a high-delay transmission group would have a greater assigned weight than a low-delay transmission group.

Large "core" networks have been deployed by Telco and other service providers. These networks form the backbone of wide-area communications. These networks offer enormous bandwidths, typically 1 Os of Gigabits per second, per pipe.

However, core networks currently in use are based on previous-generation technologies such as SONET and OTN. These technologies lack fast provisioning of access bandwidth—production optical wide area network (WAN) links can often take hours, or even days to provision. Because of the time required to provision these physical links, today's production optical wide area network (WAN) links are static, sized to fit peak loads based on worst-case scenario for peak network load. However, worst-case scenario for peak network load far exceeds normal loads on the optical wide area network (WAN). Therefore, resources allocated to the production optical wide area network (WAN) links often go underutilized.

Furthermore, previous-generation technologies such as SONET and OTN lack support for multiple link failures. That is, previous-generation technologies lack of "data restoration."

New core network technologies, such as CORONET, aim to address these two problems. CORONET offers very fast provisioning of access bandwidth. CORONET also offers triple data-restoration capability.

SUMMARY

According to one embodiment of the present invention, a computer implemented method provisions optical wavelength connections. A set of applications is grouped to form a set of application groups. A single optical connection having a bandwidth is established through a management plane for each of the set of application groups. A set of persistent upper layer connections is then established for each of the set of application groups.

According to one embodiment of the present invention, a computer program product provisions optical wavelength connections. A set of applications is grouped to form a set of application groups. A single optical connection having a bandwidth is established through a management plane for each of the set of application groups. A set of persistent upper layer connections is then established for each of the set of application groups.

According to one embodiment of the present invention, a computer provisions optical wavelength connections. A set of applications is grouped to form a set of application groups. A single optical connection having a bandwidth is established through a management plane for each of the set of application groups. A set of persistent upper layer connections is then established for each of the set of application groups.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
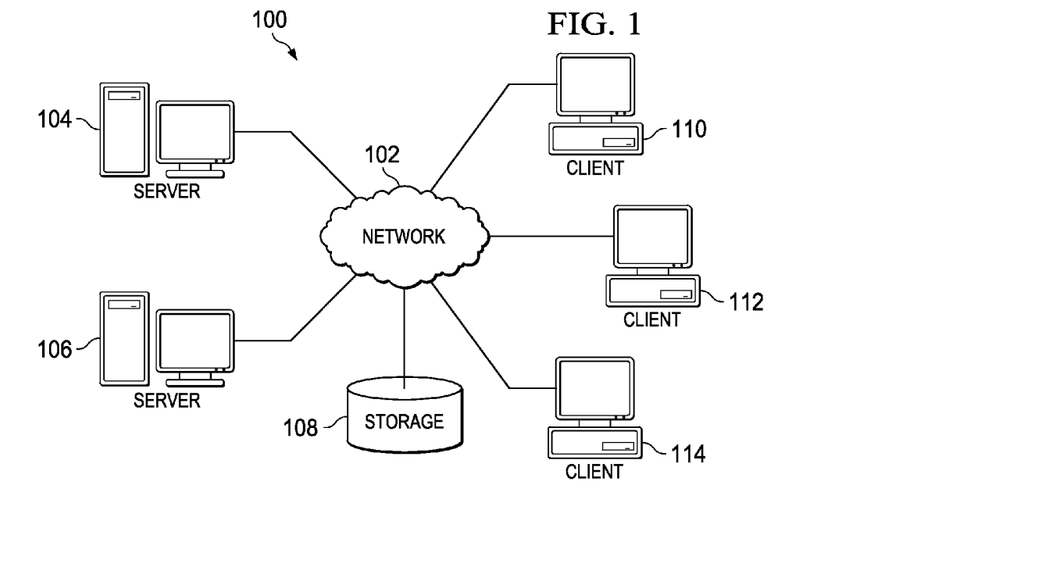
FIG. 1 depicts a pictorial representation of a network of data processing systems in which illustrative embodiments may be implemented.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
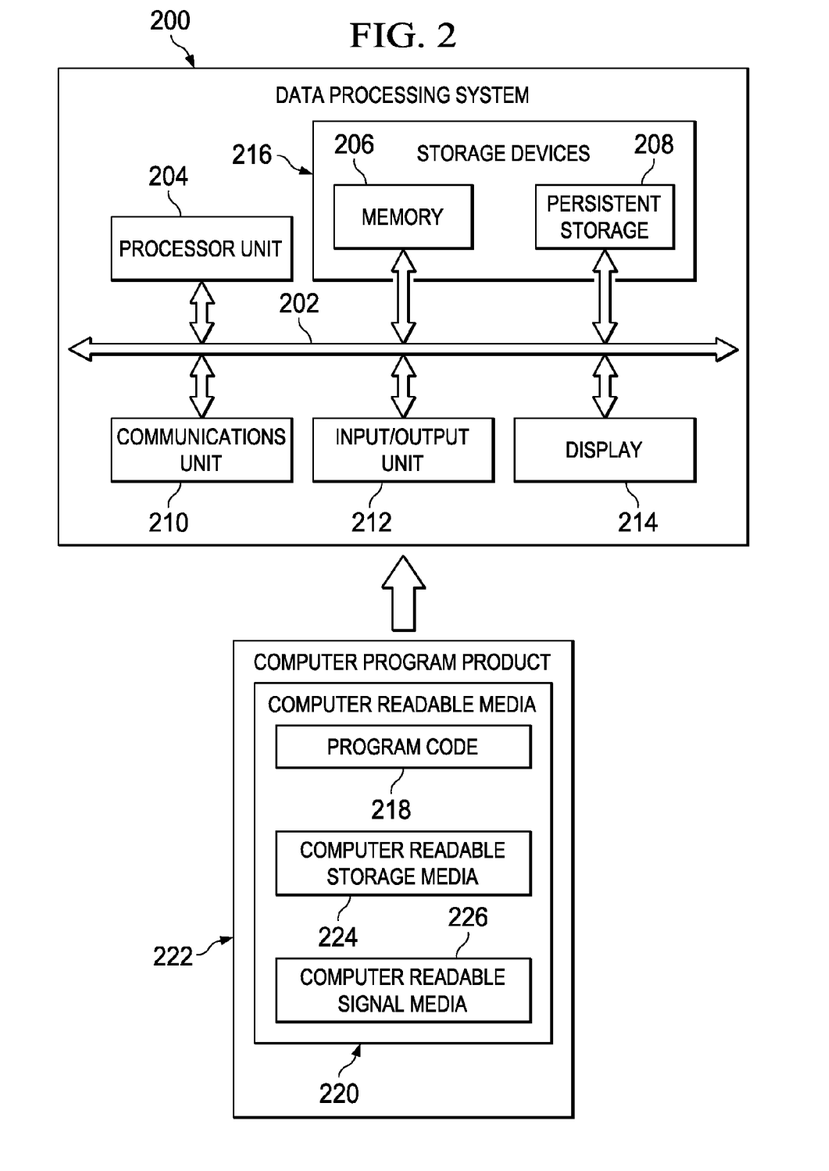
FIG. 2 is an illustration of a data processing system in accordance with an illustrative embodiment.

Turning now to FIG. 2, an illustration of a data processing system is depicted in accordance with an illustrative embodiment. Data processing system 200 may be used to implement a virtual wide area network, such as network 102 of FIG. 1. In this illustrative example, data processing system 200 includes communications framework 202, which provides communications between processor unit 204, memory 206, persistent storage 208, communications unit 210, input/output (I/O) unit 212, and display 214. In these examples, communications frame work 202 may be a bus system.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or on a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications using either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications framework 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218 rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured later or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications framework 202.

Figure 3:
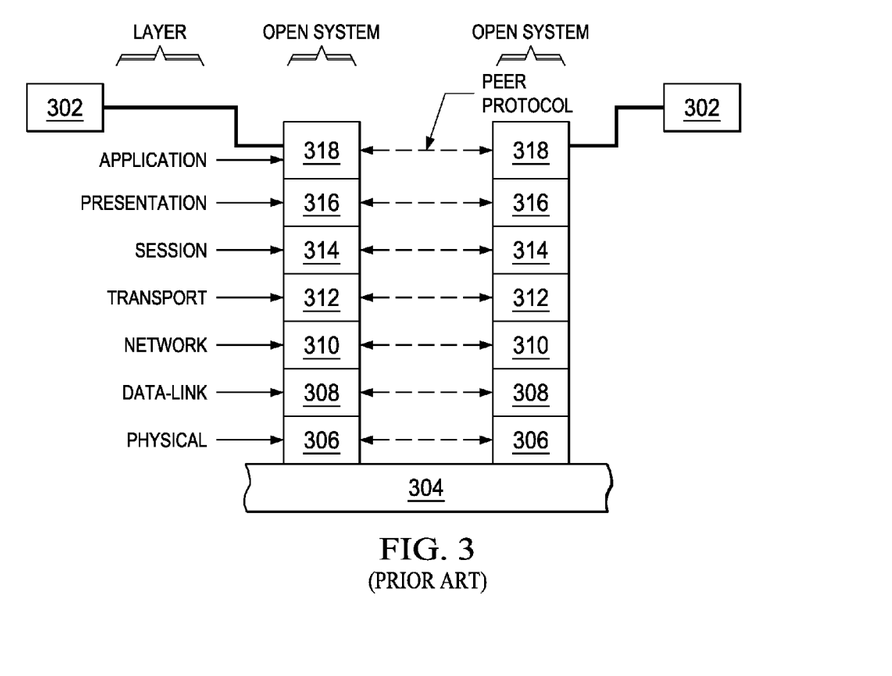
FIG. 3 is an Open Systems Interconnection model according to the prior art.

Referring now to FIG. 3, an Open Systems Interconnection model is shown according to the prior art. Open Systems Interconnection model (OSI model) 300 characterizes the functions of a communications system in terms of abstraction layers.

It is possible to replace the function of any of the layers with equivalent function implemented in a different manner without affecting the proper operation of the remaining layers of the system. The communication between one application, such as a software module or device, 302, and another module or device 302 over a communication medium 304, such as the cable, is described based on seven layers, each of which performs certain functions within the communication protocol. The lowest layer is the physical layer 306. The physical layer 306 involves the actual connections and the signaling to the communication medium 304.

The second layer is the data link layer 308. In this layer, the physical delivery of raw data between nodes on the network is accomplished. The physical signaling protocol, including link information, synchronization information, error correction information, protocol data unit (PDU) sizes, framing, etc., are conducted at this layer. In most networks, fundamental communication errors are detected and corrected here by retransmission or other means. Communication between a pair of nodes on the network depends on compatible implementation of data link layers. In summary, the link layer establishes, maintains, releases data links, and is used for error detection and physical flow control.

The third layer is the network layer 310. This layer controls the routing of information through the network, including addressing, network initialization, and the switching, segmenting, and formatting of the information. Sometimes acknowledgment of raw delivery data is accomplished at the network layer; sometimes, at the data link layer.

The next layer is the transport layer 312. This layer controls transparent data transfer, end-to-end control, multiplexing, mapping, and the like. Data delivery may imply reliable delivery, as opposed to a best effort to deliver the data that must be accounted for in the layers below the transport layer. Other classes of reliability may be selected as options as well. For example, at the transport layer, for reliability class 0, it is assumed that the data has been communicated in a reliable manner, and such things as the retransmission of missing data, reordering of the data delivered out of order, recovery from transmission errors, etc., has been corrected at or below the transport layer.

The fifth layer is the session layer 314. The session layer 314 uses the information from the transport layer to group pieces of data as associated with a given activity referred to as a session. Sessions occur between two entities at various locations on the network. At a given time, single nodes on the network may be involved in multiple sessions going to a plurality of other nodes, and many sessions may be multiplexed over the same communication medium. However, the session layer services provide for the end-to-end delivery of data associated with a given logical activity without interference by data from other activities.

Layer six is the presentation layer 316. The presentation layer 316 relates to the interface between the session layer 314 and the application layer 318 at layer seven. In the application layer 318, the actual data is applied to or received from the software module or device (302 or 302) at each end of the communication. The presentation layer 316 presents the data in a form suitable for use in the application layer 318 without compromising the network-related integrity of the session layer 314. The presentation layer 316 therefore relates to data interpretation, format, and code transformation, while the application layer relates to user application entities and management functions.

Large "core" networks have been deployed by Telco and other service providers. These networks form the backbone of wide-area communications. These networks offer enormous bandwidths, typically 1 Os of Gigabits per second, per pipe.

However, core networks currently in use are based on previous-generation technologies such as SONET and OTN. These technologies lack fast provisioning of access bandwidth—Production optical wide area network (WAN) links can often take hours, or even days to provision. Because of the time required to provision these physical links, Today's production optical wide area network (WAN) links are static, sized to fit peak loads based on worst-case scenario for peak network load. However, worst-case scenario for peak network load far exceeds normal loads on the optical wide area network (WAN). Therefore, resources allocated to the production optical wide area network (WAN) links often go underutilized.

Furthermore, previous-generation technologies such as SONET and OTN lack support for multiple link failures. That is, previous-generation technologies lack of "data restoration."

New core network technologies, such as CORONET, aim to address these two problems. CORONET offers very fast provisioning of access bandwidth. CORONET also offers triple data-restoration capability.

These underlying state of the art capabilities of the optical layer, i.e., physical layer, have not been fully leveraged by the upper layers. Virtualization is a key enabler of data center computing. Virtualization at the resource level like CPU, storage, memory and LAN has enabled data models that support shared usage of physical resources making one look like many. Virtualization at the system level can make many systems look like one.

The illustrative embodiments herein overcome the limitations of provisioning optical wide area network (WAN) links by introducing a virtual wide area network (VWaN) link that can be rate adjusted on demand. The virtual wide area network link is a dynamic optical pipe that supports multiple application connections from a source to a destination. The virtual wide area network link is configured on an optical wavelength. By maintaining a persistent upper layer state, the virtual wide area network link then is adjusted as the load over the link changes. The virtual wide area network link can be rerouted as faults occur or better routes are available, modified as quality of service requirements change and can be enabled or disabled, all while maintaining the upper layer state.

Figure 4:
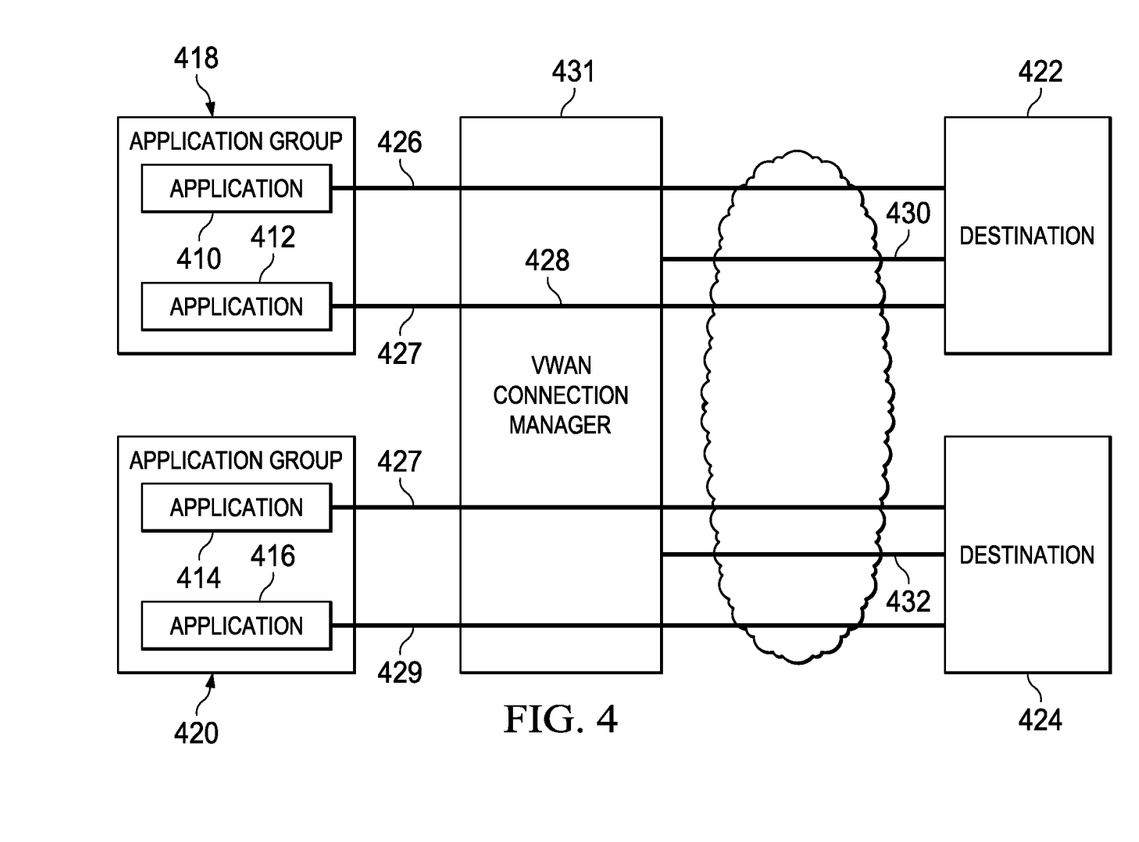
FIG. 4 is a data flow for a virtual wide area network according to an illustrative embodiment.

Referring now to FIG. 4, a data flow for a virtual wide area network is shown according to an illustrative embodiment. Virtual wide area network 400 can be implemented in a network data processing system, such as network data processing system 100 of FIG. 1.

Application 410, 412, 414, and 416 are software designed to help a user perform specific tasks. Application 410, 412, 414, and 416 can be, for example, but are not limited to, enterprise software, accounting software, office suites, graphics software and media players.

Application group 418 and 420 are sets of one or more applications, such as application 410, 412, 414, and 416. Application groups 418 and 420 include applications that are grouped according to destinations, such as destination 422 and 424. Destination 422 and 424 are nodes, switches routers, computers, or data processing systems to which application 410, 412, 414, and 416 direct traffic. Application 410 and application 412 have a common destination, destination 422, and are therefore grouped into a common application group, application group 418. Application 414 and application 416 have a common destination, destination 424, and are therefore grouped into a common application group, application group 420.

Application 410 connects to destination 422 through upper layer connection 426. Application 412 connects to destination 422 through upper layer connection 428. Application 410 connects to destination 422 through upper layer connection 427. Application 412 connects to destination 422 through upper layer connection 429. Each of upper layer connections 426, 427, 428, and 429 is an abstraction of the functions of a communications system, and can include layers such as session layer 314 of FIG. 3, presentation layer 316 of FIG. 3, and application layer 318 of FIG. 3.

Virtual wide area network 400 enables each of upper layer connections 426, 427, 428, and 429 to be a persistent upper layer connection. Virtual wide area network 400 allows time window for changes to lower layer connections without upper layer connections 426, 427, 428, and 429 being marked as down. In one illustrative embodiment, the time window is a 50 millisecond time window.

Within the time window, each of upper layer connections 426, 427, 428, and 429 is persistent through various state changes to lower layer connections. For example, the various state changes can include, but are not limited to, bandwidth adjustment of an optical wavelength connection, rerouting of the optical wavelength connection, modification of the connection attributes, such as quality of service, for the optical wavelength connection, and enabling/disabling of the optical wavelength connection.

For each of application group 418 and application group 420, a single lower layer connection is created, connecting the application group to the destination. Application group 418 connects to destination 422 through lower layer connection 430. Application group 420 connects to destination 424 through lower layer connection 432. Each of lower layer connections 430 and 432 is an abstraction of the functions of a communications system, and can include layers such as physical layer 306 of FIG. 3, data link layer 308 of FIG. 3, network layer 310 of FIG. 3, and transport layer 312 of FIG. 3. Lower layer connection 430 and lower layer connection 432 are virtual connections. Lower layer connection 430 and lower layer connection 432 can undergo various state changes without effecting the persistent upper layer connections, such as upper layer connections 426, 427, 428, and 429. The various state changes can include, but are not limited to, bandwidth adjustment of an optical wavelength connection, rerouting of the optical wavelength connection, modification of the connection attributes, such as quality of service, for the optical wavelength connection, and enabling/disabling of the optical wavelength connection.

Connection manager 431 is software component that monitors and manages the performance of the dynamically provisioned optical wavelength connections between Application groups 418, 420 and destinations 422, 424.

Connection manager 431 dynamically provisions lower layer connection 430 and lower layer connection 432 at an initial bandwidth. In one illustrative embodiment, lower layer connection 430 and lower layer connection 432 are optical wavelength connections of a bandwidth which prescribed at an initial value, determined though a historical average load for the optical wavelength connections. Connection manager 431 can then poll the utilization of the optical wavelength connection that has been allocated or a threshold can be set on the utilization.

Connection manager 431 can monitor lower layer connection 430 and lower layer connection 432 and adjusting the bandwidth of the VWaN connection through multiple methods. For example, but not limited to the following, connection manager 431 can monitor TCP/IP data packets and determine bit rate; connection manager 431 can perform packet inspection to determine the application to classify the load characteristics; connection manager 431 can monitor TCP SYN/FIN packets to determine the number of connection/close attempts; and connection manager 431 can monitor for network connection creation attempts, such as CORONET creation attempts.

When the utilization of the initial bandwidth hits a threshold condition, connection manager 431 can destroy an existing lower layer connection, such as lower layer connection 430 or lower layer connection 432. Within the time window, connection manager 431 can then create a new lower layer connection, such as lower layer connection 430 or lower layer connection 432, with a new bandwidth. Creation of a new lower layer connection optimizes utilization of the total bandwidth available and is a more cost effective utilization of resources.

Additionally, within the time window, connection manager 431 can reroute an existing lower layer connection, such as lower layer connection 430 or lower layer connection 432, when a failure occurs in the network. Rerouting an existing lower layer connection such as lower layer connection 430 or lower layer connection 432, is transparent to the upper layer connections, such as upper layer connections 426, 427, 428, and 429. Additionally if lower latency routes become available during the life of the lower layer connection, connection manager 431 can reroute the lower layer connection, transparent to the upper layer, in order to take advantage of the lower latency route.

Connection manager 431 can modify attributes of an existing lower layer connection, such as a quality of service latency requirement. Modification of the attributes of an existing lower layer connection can result in either or both of destroy/recreating an existing lower layer connection, and rerouting an existing lower layer connection.

Figures 5, 6:
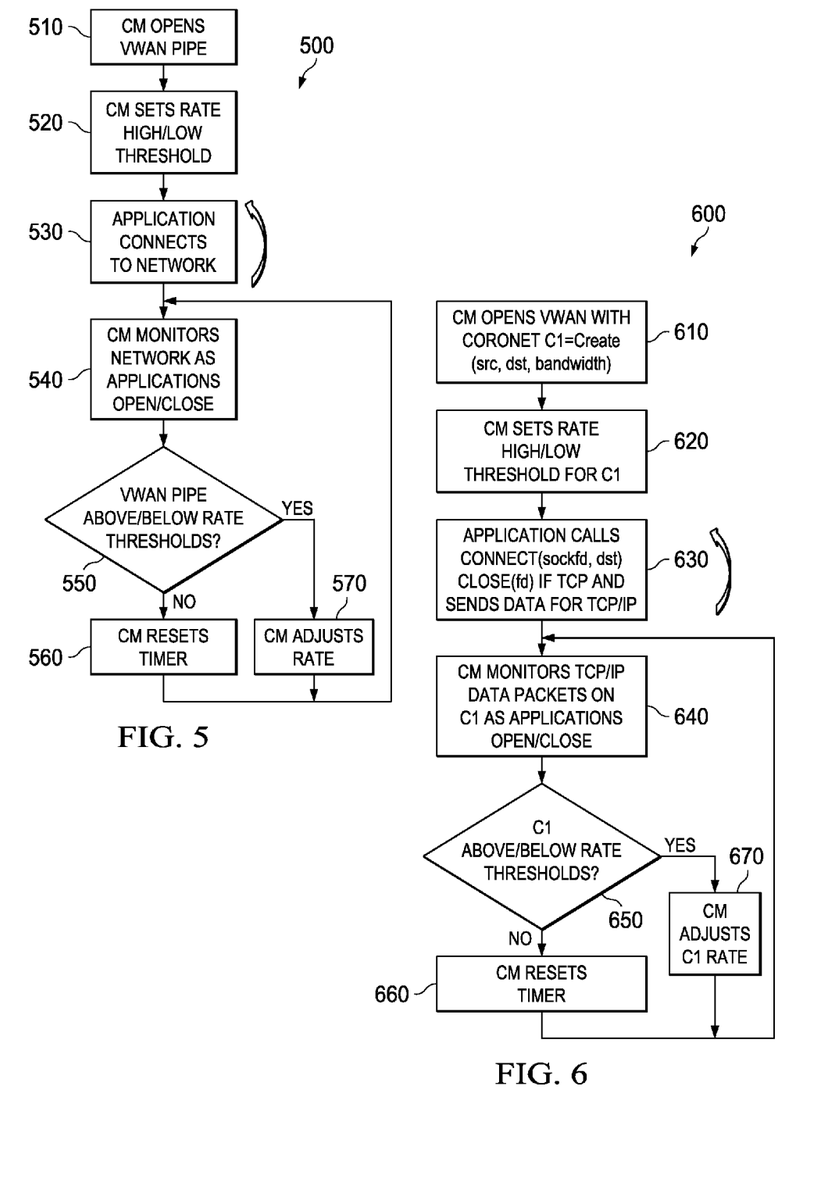
FIG. 5 is a process for adjusting a lower layer connection in a virtual wide area network application and adaptive provisioning flowchart according to an illustrative embodiment.
FIG. 6 is a flowchart of a process for monitoring TCP/IP data packets in a virtual wide area network according to an illustrative embodiment.

Referring now to FIG. 5, a process for adjusting a lower layer connection in a virtual wide area network application and adaptive provisioning flowchart is shown according to an illustrative embodiment. Process 500 is a software process, executing on a software system, such as connection manager 431 of FIG. 4. Process 500 is a generalized software process for adjusting a lower layer connection, such as one of such as one of lower layer connections 430 and 432 of FIG. 4.

Process 500 begins by opening a pipe to a wide area network (step 510). A pipe is an established route over which information can flow. The pipe includes one lower layer connection, such as one of lower layer connections 430 and 432, and at least one upper layer connection, such as upper layer connections 426, 427, 428, and 429 of FIG. 4. In one illustrative embodiment, the pipe can be an optical wavelength connection of a certain wavelength and bandwidth that prescribed at an initial value. The initial value of the bandwidth can be determined through a historical average loads for the optical wavelength connections.

Process 500 then sets thresholds for utilization of the pipe's bandwidth (step 520). Each threshold sets certain usages, upon which being met, the connection manager adjusts the pipe's allocated bandwidth. The thresholds can include both an upper usage threshold, and a lower usage threshold.

Process 500 then connects requesting applications, or application groups to the wide area network utilize the pipe (step 530). The applications can be applications such as applications 410, 412, 414, and 416 of FIG. 4. The application groups can be application groups such as application groups 418 and 420 of FIG. 4. For each application group, a single lower layer connection is created, connecting the application group to the destination. Each lower layer connection is a virtual connection. That is, each lower layer connection can undergo various state changes without affecting the persistent upper layer connections provided to the applications. The various state changes can include, but are not limited to, bandwidth adjustment of an optical wavelength connection, rerouting of the optical wavelength connection, modification of the connection attributes, such as quality of service, for the optical wavelength connection, and enabling/disabling of the optical wavelength connection.

Process 500 then monitors the network as applications open or close, and are added to or removed from the application groups (step 540). For example, process 500 can monitor TCP/IP data packets and determine bit rate; process 500 can perform packet inspection to determine the application to classify the load characteristics; process 500 can monitor TCP SYN/FIN packets to determine the number of connection/close attempts; and process 500 can monitor for network connection creation attempts, such as CORONET creation attempts.

Process 500 then determines whether current bandwidth usage of the pipe goes beyond one of the thresholds for utilization of the pipe's bandwidth (step 550). The current bandwidth usage of the pipe can go beyond an upper threshold for bandwidth usage by exceeding the upper threshold, or by exceeding some predetermined percentage of the allocated bandwidth. The current bandwidth usage of the pipe can go beyond a lower threshold for bandwidth usage by falling beneath the lower threshold, or by being below some predetermined percentage of the allocated bandwidth.

Responsive to determining that the current bandwidth usage of the pipe does not go beyond one of the thresholds for utilization of the pipe's bandwidth ("no" at step 550), process 500 resets a timer (step 560). The timer measures a defined duration before the connection manager makes a next determination of current bandwidth. Process 500 then iterates back to step 540 to continue monitoring the network.

Responsive to determining that the current bandwidth usage of the pipe does go beyond one of the thresholds for utilization of the pipe's bandwidth ("yes" at step 550), process 500 adjusts the lower layer connection of the pipe (step 570). When the utilization of the initial bandwidth hits a threshold condition, process 500 can destroy an existing lower layer connection, such as lower layer connection 430 of FIG. 4 or lower layer connection 432 of FIG. 4. Within the time window, 500 can then create a new lower layer connection, such as lower layer connection 430 of FIG. 4 or lower layer connection 432 of FIG. 4, with a new bandwidth. Creation of a new lower layer connection optimizes utilization of the total bandwidth available and is a more cost effective utilization of resources.

Additionally, within the time window, process 500 can reroute an existing lower layer connection, such as lower layer connection 430 of FIG. 4 or lower layer connection 432 of FIG. 4, when a failure occurs in the network. Rerouting an existing lower layer connection is transparent to the upper layer connections. Additionally if lower latency routes become available during the life of the lower layer connection, connection manager 431 can reroute the lower layer connection, transparent to the upper layer, in order to take advantage of the lower latency route.

Additionally, within the time window, process 500 can modify attributes of an existing lower layer connection, such as a quality of service latency requirement. Modification of the attributes of an existing lower layer connection can result in either or both of destroy/recreating an existing lower layer connection, and rerouting an existing lower layer connection. Responsive to adjusting the lower layer connection of the pipe, process 500 iterates back to step 540 to continue monitoring the network.

Referring now to FIG. 6, a flowchart of a process for monitoring TCP/IP data packets in a virtual wide area network is shown according to an illustrative embodiment. Process 600 is a software process, executing on a software system, such as connection manager 431 of FIG. 4. Process 600 is a software process for adjusting a lower layer connection, such as one of such as one of lower layer connections 430 and 432 of FIG. 4, by examining data packets to derive bandwidth utilization.

Process 600 begins by opening creating a pipe to a wide area network (step 610). A pipe is an established route over which information can flow. The pipe includes one lower layer connection, such as one of lower layer connections 430 and 432, and at least one upper layer connection, such as upper layer connections 426, 427, 428, and 429 of FIG. 4. In one illustrative embodiment, the pipe can be an optical wavelength connection of a certain wavelength and bandwidth that prescribed at an initial value. The initial value of the bandwidth can be determined through a historical average loads for the optical wavelength connections.

Process 600 then sets thresholds for utilization of the pipe's bandwidth (step 620). Each threshold sets certain usages, upon which being met, the connection manager adjusts the pipe's allocated bandwidth. The thresholds can include both an upper usage threshold, and a lower usage threshold.

Process 600 then connects requesting applications, or application groups to the wide area network utilize the pipe (step 630). The applications can be applications such as applications 410, 412, 414, and 416 of FIG. 4. The application groups can be application groups such as application groups 418 and 420 of FIG. 4. For each application group, a single lower layer connection is created, connecting the application group to the destination. Each lower layer connection is a virtual connection. That is, each lower layer connection can undergo various state changes without affecting the persistent upper layer connections provided to the applications. The various state changes can include, but are not limited to, bandwidth adjustment of an optical wavelength connection, rerouting of the optical wavelength connection, modification of the connection attributes, such as quality of service, for the optical wavelength connection, and enabling/disabling of the optical wavelength connection.

Process 600 then monitors network data packets as applications open or close connections, and are added to or removed from the application groups (step 640). A default link bandwidth is set as applications open connections and subsequently the Connection Manager monitors network data packets to determine if the bandwidth utilization is above a certain policy based threshold. Then for example, the bandwidth of the underlying link can be increased when the bandwidth exceeds a policy threshold and the bandwidth can be decreased when below a lower threshold mark.

Process 600 then determines whether current bandwidth usage of the pipe goes beyond one of the thresholds for utilization of the pipe's bandwidth (step 660). The current bandwidth usage of the pipe can go beyond an upper threshold for bandwidth usage by exceeding the upper threshold, or by exceeding some predetermined percentage of the allocated bandwidth. The current bandwidth usage of the pipe can go beyond a lower threshold for bandwidth usage by falling beneath the lower threshold, or by being below some predetermined percentage of the allocated bandwidth.

Responsive to determining that the current bandwidth usage of the pipe does not go beyond one of the thresholds for utilization of the pipe's bandwidth ("no" at step 660), process 600 resets a timer (step 660). The timer measures a defined duration before the connection manager makes a next determination of current bandwidth. Process 600 then iterates back to step 640 to continue monitoring the network.

Responsive to determining that the current bandwidth usage of the pipe does go beyond one of the thresholds for utilization of the pipe's bandwidth ("yes" at step 660), process 600 adjusts the lower layer connection of the pipe (step 670). When the utilization of the initial bandwidth hits a threshold condition, process 600 can destroy an existing lower layer connection, such as lower layer connection 430 of FIG. 4 or lower layer connection 432 of FIG. 4. Within the time window, 600 can then create a new lower layer connection, such as lower layer connection 430 of FIG. 4 or lower layer connection 432 of FIG. 4, with a new bandwidth. Creation of a new lower layer connection optimized utilization of the total bandwidth available and is a more cost effective utilization of resources.

Additionally, within the time window, process 600 can reroute an existing lower layer connection, such as lower layer connection 430 of FIG. 4 or lower layer connection 432 of FIG. 4, when a failure occurs in the network. Rerouting an existing lower layer connection is transparent to the upper layer connections. Additionally, if lower latency routes become available during the life of the lower layer connection, connection manager 431 can reroute the lower layer connection, transparent to the upper layer, in order to take advantage of the lower latency route.

Additionally, within the time window, process 600 can modify attributes of an existing lower layer connection, such as a quality of service latency requirement. Modification of the attributes of an existing lower layer connection can result in either or both of destroy/recreating an existing lower layer connection, and rerouting an existing lower layer connection. Responsive to adjusting the lower layer connection of the pipe, process 600 iterates back to step 640 to continue monitoring the network.

Figures 7, 8:
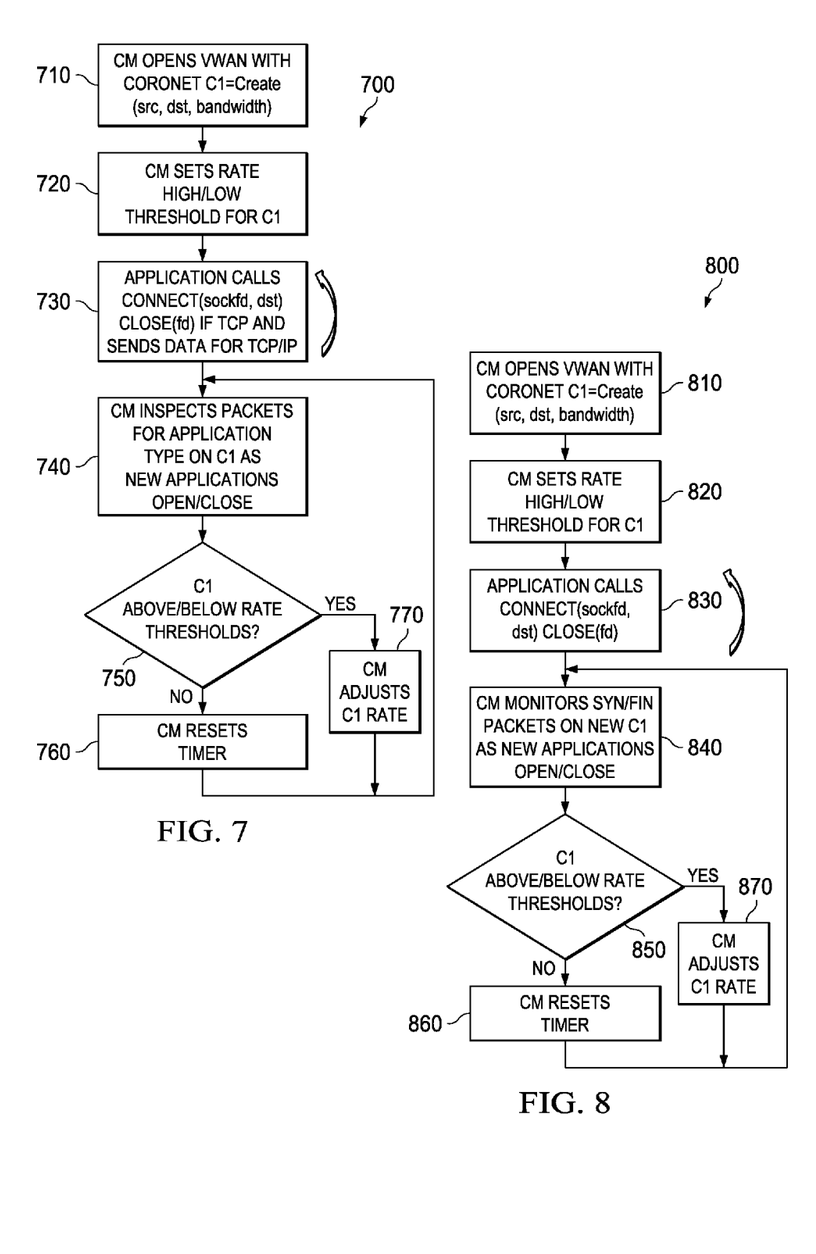
FIG. 7 is a flowchart of a process for performing packet inspection to identify an owning application according to an illustrative embodiment.
FIG. 8 is a flowchart of a process for monitoring network connection attempts with TCP SYN/FIN Packets.

Referring now to FIG. 7, a flowchart of a process for performing packet inspection to identify an owning application is shown according to an illustrative embodiment. Process 700 is a software process, executing on a software system, such as connection manager 431 of FIG. 4. Process 700 is a software process for adjusting a lower layer connection, such as one of such as one of lower layer connections 430 and 432 of FIG. 4, by performing deep packet inspection to determine the application type.

Process 700 begins by opening creating a pipe to a wide area network (step 710). A pipe is an established route over which information can flow. The pipe includes one lower layer connection, such as one of lower layer connections 430 and 432, and at least one upper layer connection, such as upper layer connections 426, 427, 428, and 429 of FIG. 4. In one illustrative embodiment, the pipe can be an optical wavelength connection of a certain wavelength and bandwidth that prescribed at an initial value. The initial value of the bandwidth can be determined through a historical average loads for the optical wavelength connections.

Process 700 then sets thresholds for utilization of the pipe's bandwidth (step 720). Each threshold sets certain usages, upon which being met, the connection manager adjusts the pipe's allocated bandwidth. The thresholds can include both an upper usage threshold, and a lower usage threshold.

Process 700 then connects requesting applications, or application groups to the wide area network utilize the pipe (step 730). The applications can be applications such as applications 410, 412, 414, and 416 of FIG. 4. The application groups can be application groups such as application groups 418 and 420 of FIG. 4. For each application group, a single lower layer connection is created, connecting the application group to the destination. Each lower layer connection is a virtual connection. That is, each lower layer connection can undergo various state changes without affecting the persistent upper layer connections provided to the applications. The various state changes can include, but are not limited to, bandwidth adjustment of an optical wavelength connection, rerouting of the optical wavelength connection, modification of the connection attributes, such as quality of service, for the optical wavelength connection, and enabling/disabling of the optical wavelength connection.

Process 700 then monitors the network as applications open or close, and are added to or removed from the application groups (step 740). The Connection Manager does Deep packet inspection including the protocol headers can be performed to monitor the types of applications utilizing a link. Network policies can be used to enforce those policies at the 650 decision point. For example a policy might increase the bandwidth of the underlying link in an application group when N number of instances of a given video application are created in that group. Or a policy might increase the bandwidth of an underlying link when certain applications like video applications are added to a an application group.

Process 700 then determines whether current bandwidth usage of the pipe goes beyond one of the thresholds for utilization of the pipe's bandwidth (step 770). The current bandwidth usage of the pipe can go beyond an upper threshold for bandwidth usage by exceeding the upper threshold, or by exceeding some predetermined percentage of the allocated bandwidth. The current bandwidth usage of the pipe can go beyond a lower threshold for bandwidth usage by falling beneath the lower threshold, or by being below some predetermined percentage of the allocated bandwidth.

Responsive to determining that the current bandwidth usage of the pipe does not go beyond one of the thresholds for utilization of the pipe's bandwidth ("no" at step 770), process 700 resets a timer (step 760). The timer measures a defined duration before the connection manager makes a next determination of current bandwidth. Process 700 then iterates back to step 740 to continue monitoring the network.

Responsive to determining that the current bandwidth usage of the pipe does go beyond one of the thresholds for utilization of the pipe's bandwidth ("yes" at step 770), process 700 adjusts the lower layer connection of the pipe (step 770). When the utilization of the initial bandwidth hits a threshold condition, process 700 can destroy an existing lower layer connection, such as lower layer connection 430 of FIG. 4 or lower layer connection 432 of FIG. 4. Within the time window, 700 can then create a new lower layer connection, such as lower layer connection 430 of FIG. 4 or lower layer connection 432 of FIG. 4, with a new bandwidth. Creation of a new lower layer connection optimizes utilization of the total bandwidth available and is a more cost effective utilization of resources.

Additionally, within the time window, process 700 can reroute an existing lower layer connection, such as lower layer connection 430 of FIG. 4 or lower layer connection 432 of FIG. 4, when a failure occurs in the network. Rerouting an existing lower layer connection is transparent to the upper layer connections. Additionally if lower latency routes become available during the life of the lower layer connection, connection manager 431 can reroute the lower layer connection, transparent to the upper layer, in order to take advantage of the lower latency route.

Additionally, within the time window, process 700 can modify attributes of an existing lower layer connection, such as a quality of service latency requirement. Modification of the attributes of an existing lower layer connection can result in either or both of destroy/recreating an existing lower layer connection, and rerouting an existing lower layer connection. Responsive to adjusting the lower layer connection of the pipe, process 700 iterates back to step 740 to continue monitoring the network.

Referring now to FIG. 8, a flowchart of a process for performing packet inspection to identify an owning application is shown according to an illustrative embodiment. Process 800 is a software process, executing on a software system, such as connection manager 431 of FIG. 4. Process 800 is a software process for adjusting a lower layer connection, such as one of such as one of lower layer connections 430 and 432 of FIG. 4, by examining a number of connections opening and closing.

Process 800 begins by opening creating a pipe to a wide area network (step 810). A pipe is an established route over which information can flow. The pipe includes one lower layer connection, such as one of lower layer connections 430 and 432, and at least one upper layer connection, such as upper layer connections 426, 427, 428, and 429 of FIG. 4. In one illustrative embodiment, the pipe can be an optical wavelength connection of a certain wavelength and bandwidth that prescribed at an initial value. The initial value of the bandwidth can be determined through a historical average loads for the optical wavelength connections.

Process 800 then sets thresholds for utilization of the pipe's bandwidth (step 820). Each threshold sets certain usages, upon which being met, the connection manager adjusts the pipe's allocated bandwidth. The thresholds can include both an upper usage threshold, and a lower usage threshold.

Process 800 then connects requesting applications, or application groups to the wide area network utilize the pipe (step 830). The applications can be applications such as applications 410, 412, 414, and 416 of FIG. 4. The application groups can be application groups such as application groups 418 and 420 of FIG. 4. For each of application group, a single lower layer connection is created, connecting the application group to the destination. Each lower layer connection is a virtual connection. That is, each lower layer connection can undergo various state changes without affecting the persistent upper layer connections provided to the applications. The various state changes can include, but are not limited to, bandwidth adjustment of an optical wavelength connection, rerouting of the optical wavelength connection, modification of the connection attributes, such as quality of service, for the optical wavelength connection, and enabling/disabling of the optical wavelength connection.

Process 800 then monitors the network as applications open or close connections, and are added to or removed from the application groups (step 840). The Connection Manager monitors the TCP SYN/FIN packets for each application to determine when connections are being opened (SYN) or closed (FIN). Then for example, Network policy can be utilized to increase the bandwidth of the underlying link based on which application is opening a connection(s) and similarly the bandwidth of the underlying link can be reduced when application closes a connection(s).

Process 800 then determines whether current bandwidth usage of the pipe goes beyond one of the thresholds for utilization of the pipe's bandwidth (step 880). The current bandwidth usage of the pipe can go beyond an upper threshold for bandwidth usage by exceeding the upper threshold, or by exceeding some predetermined percentage of the allocated bandwidth. The current bandwidth usage of the pipe can go beyond a lower threshold for bandwidth usage by falling beneath the lower threshold, or by being below some predetermined percentage of the allocated bandwidth.

Responsive to determining that the current bandwidth usage of the pipe does not go beyond one of the thresholds for utilization of the pipe's bandwidth ("no" at step 880), process 800 resets a timer (step 860). The timer measures a defined duration before the connection manager makes a next determination of current bandwidth. Process 800 then iterates back to step 840 to continue monitoring the network.

Responsive to determining that the current bandwidth usage of the pipe does not go beyond one of the thresholds for utilization of the pipe's bandwidth ("no" at step 870), process 800 adjusts the lower layer connection of the pipe (step 870). When the utilization of the initial bandwidth hits a threshold condition, process 800 can destroy an existing lower layer connection, such as lower layer connection 430 of FIG. 4 or lower layer connection 432 of FIG. 4. Within the time window, 800 can then create a new lower layer connection, such as lower layer connection 430 of FIG. 4 or lower layer connection 432 of FIG. 4, with a new bandwidth. Creation of a new lower layer connection optimizes utilization of the total bandwidth available and is a more cost effective utilization of resources.

Additionally, within the time window, process 800 can reroute an existing lower layer connection, such as lower layer connection 430 of FIG. 4 or lower layer connection 432 of FIG. 4, when a failure occurs in the network. Rerouting an existing lower layer connection is transparent to the upper layer connections. Additionally if lower latency routes become available during the life of the lower layer connection, connection manager 431 can reroute the lower layer connection, transparent to the upper layer, in order to take advantage of the lower latency route.

Additionally, within the time window, process 800 can modify attributes of an existing lower layer connection, such as a quality of service latency requirement. Modification of the attributes of an existing lower layer connection can result in either or both of destroy/recreating an existing lower layer connection, and rerouting an existing lower layer connection. Responsive to adjusting the lower layer connection of the pipe, process 800 iterates back to step 840 to continue monitoring the network.

Thus, illustrative embodiments of the present invention provide a computer implemented method, computer system, and computer program product a provisioning optical wavelength connections. A set of applications is grouped to form a set of application groups. A single optical connection having a bandwidth is established through a management plane for each of the set of application groups. A set of persistent upper layer connections is then established for each of the set of application groups.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to explain best the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for managing performance of optical wavelength connections in an optical network, the computer implemented method comprising:

grouping, by a computer, a set of applications to form a set of application groups where an application group has a plurality of applications;

establishing, by the computer, a single optical connection for each of the set of application groups over fiber optic cables in the optical network, wherein the single optical connection has a bandwidth;

establishing, by the computer, a set of persistent upper layer connections for each of the set of application groups;

monitoring, by the computer, a network traffic demand on the single optical connection by determining whether the network traffic demand on the single optical connection falls beneath a lower bandwidth threshold and determining whether the network traffic demand on the single optical connection exceeds an upper bandwidth threshold;

responsive to the computer determining that the network traffic demand on the single optical connection is less than the lower bandwidth threshold, modifying, by the computer, the single optical connection by decreasing the bandwidth of the single optical connection; and responsive to the computer determining that the network traffic demand on the single optical connection is greater than the upper bandwidth threshold, modifying, by the computer, the single optical connection by increasing the bandwidth of the single optical connection, wherein the set of persistent upper layer connections for each of the set of applications are not marked as being down during the modifying of the bandwidth.

2. The computer implemented method of claim 1, wherein the grouping, by the computer, of the set of applications into the set of application groups further comprises:
grouping, by the computer, the set of applications according to a set of destination addresses for each of the set of applications to form the set of application groups, wherein each set of the set of application groups has an identical destination address.

3. The computer implemented method of claim 1, wherein the single optical connection comprises a single optical wavelength for each of the set of application groups, and wherein each of the set of persistent upper layer connections for each of the set of applications comprises a transport protocol over a network protocol connection and an input output control driver for each of the set of persistent upper layer connections.

4. The computer implemented method of claim 1, wherein the bandwidth is determined based on a historical load for the set of applications.

5. A computer program product for managing performance of optical wavelength connections in an optical network, the computer program product comprising:
a non-transitory computer readable storage medium having computer readable program code embodied therewith that is executable by a computer, the computer readable program code comprising:
computer readable program code configured to group a set of applications to form a set of application groups;
computer readable program code configured to establish a single optical connection for each of the set of application groups over fiber optic cables in the optical network, wherein the single optical connection has a bandwidth;
computer readable program code configured to establish a set of persistent upper layer connections for each of the set of applications;
computer readable program code configured to monitor a network traffic demand on the single optical connection by determining whether the network traffic demand on the single optical connection falls beneath a lower bandwidth threshold and determining whether the network traffic demand on the single optical connection exceeds an upper bandwidth threshold;
computer readable program code configured, responsive to determining that the network traffic demand on the single optical connection is less than the lower bandwidth threshold, to modify the single optical connection by decreasing the bandwidth of the single optical connection; and
computer readable program code configured, responsive to determining that the network traffic demand on the single optical connection is greater than the upper bandwidth threshold, to modify the single optical connection by increasing the bandwidth of the single optical connection, wherein the set of persistent upper layer connections for each of the set of applications are not marked as being down during modifying of the bandwidth.

6. The computer program product of claim 5, wherein the computer readable program code configured to group the set of applications into the set of application groups further comprises:
computer readable program code configured to group the set of applications according to a set of destination addresses for each of the set of applications to form the set of application groups, wherein each set of the set of application groups has an identical destination address.

7. The computer program product of claim 5, wherein the single optical connection comprises a single optical wavelength for each of the set of application groups, and wherein each of the set of persistent upper layer connections for each of the set of applications comprises a transmission control protocol over internet protocol connection and an input output control driver for each of the set of persistent upper layer connections.

8. The computer program product of claim 5, wherein the bandwidth is determined based on a historical load for the set of applications.

9. A computer comprising:
a memory having computer readable program code embodied therewith for managing performance of optical wavelength connections in an optical network; and
a bus connecting the memory to a processor,
wherein the processor executes the computer readable program code: to group a set of applications to form a set of application groups; to establish a single optical connection for each of the set of application groups over fiber optic cables in the optical network, wherein the single optical connection has a bandwidth; to establish a set of persistent upper layer connections for each of the set of applications; to monitor a network traffic demand on the single optical connection by determining whether the network traffic demand on the single optical connection falls beneath a lower bandwidth threshold and determining whether the network traffic demand on the single optical connection exceeds an upper bandwidth threshold; to modify the single optical connection by decreasing the bandwidth of the single optical connection in response to determining that the network traffic demand on the single optical connection is less than the lower bandwidth threshold; and to modify the single optical connection by increasing the bandwidth of the single optical connection in response to determining that the network traffic demand on the single optical connection is greater than the upper bandwidth threshold, wherein the set of persistent upper layer connections for each of the set of applications are not marked as being down during modifying of the bandwidth.

10. The computer of claim 9, wherein the processor executing the computer readable program code to group the set of applications into the set of application groups further comprises:
the processor executing the computer readable program code to group the set of applications according to a set of destination address for each of the set of applications to form the set of application groups, wherein each set of the set of application groups has an identical destination address.

11. The computer of claim 9, wherein the single optical connection comprises a single optical wavelength for each of the set of application groups, and wherein each of the set of persistent upper layer connections for each of the set of applications comprises a transmission control protocol over internet protocol connection and an input output control driver for each of the set of persistent upper layer connections.

12. The computer of claim 9, wherein the bandwidth is determined based on a historical load for the set of applications.

* * * * *